3,586,638
CATALYST SYSTEM COMPRISING AND ORGANO-
ALUMINUM OR ORGANOZINC AND A METAL
SALT OF A BETA-DIKETONE
Henry L. Hsieh, Bartlesville, Okla., assignor to
Phillips Petroleum Company
No Drawing. Original application June 7, 1965, Ser. No.
462,121, now Patent No. 3,468,860, dated Sept. 23,
1969. Divided and this application Feb. 20, 1969, Ser.
No. 801,181
Int. Cl. C08g 23/14
U.S. Cl. 252—431                5 Claims

ABSTRACT OF THE DISCLOSURE

A polymerization catalyst comprising (a) an organometallic compound selected from the group consisting of organoaluminum and organozinc compounds and (b) a metal salt of a beta-diketone wherein the metal is selected from Groups II–A, I–B, II–B, III–B, or IV–B of the Periodic Table.

---

This application is a division of my pending application Ser. No. 462,121, filed June 7, 1965, now U.S. Pat. 3,468,860.

This invention relates to catalyst systems which can be used for polymerizing epoxides.

Conventional processes of polymerizing alkene oxides involve the use of a catalyst system comprising an organoaluminum compound and an acetylacetonate of a metal from Groups V–B, VI–B, VII–B, and VIII of the Periodic Table of the Elements reported in the "Handbook of Chemistry and Physics," 45th edition, page B–2, The Chemical Rubber Company (1964). Specific prior art catalyst systems within this class include triisobutylaluminum or diethylaluminum chloride in admixture with a metal acetylacetonate such as nickel acetylacetonate, cobalt acetylacetonate, iron acetylacetonate, vanadium cetylacetonate, chromium acetylacetonate, or manganese acetylacetonate. Although these catalyst systems have been used for effecting the polymerization of alkene oxides, process efficiency is low because of the extremely low monomer conversion rate. For this reason, these catalysts have not received widespread commercial success in the production of polymers of alkene oxides.

According to this invention, these and other disadvantages of the prior art processes are overcome by providing a novel catalyst system comprising an organometallic compound and a metal salt of a beta-diketone. The organometallic compound of the catalyst system of this invention can be an organozinc or an organoaluminum compound such as diorganozinc compounds, triorganoaluminum compounds, organozinc monohalides, organoaluminum monohalides, organoaluminum dihalides, and organoaluminum sesquihalides. The metal salt of the beta-diketone of the catalyst system can be the compound formed by uniting a beta-diketone with a metal selected from Groups II–A, III–A, IV–A, I–B, and II–B of the Periodic Table of the Elements reported in the "Handbook of Chemistry and Physics," 45th edition, page B–2, The Chemical Rubber Company (1964). Mixtures of two or more of the alkene oxides can be copolymerized by means of the novel catalyst system of this invention. When at least one of the alkene oxides is unsaturated, the polymer product is sulfur vulcanizable.

Accordinlgy, it is an object of this invention to provide a novel catalyst system which can be used for polymerizing alkene oxides.

Other objects of the invention will become apparent to one skilled in the art after studying the following detailed description and the appended claims.

In the practice of this invention, the novel catalyst system can be employed for polymerizing any alkene oxide. For example, alkene oxides containing up to and including 20 carbon atoms per molecule can be polymerized. Generally, it is preferred that the alkene oxide monomer contain from about 2 to about 8 carbon atoms. Alkene oxides which can be polymerized in accordance with this invention can be represented by the formula

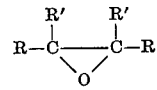

wherein R and R' are selected from the group consisting of hydrogen, saturated aliphatic, saturated cycloaliphatic, monoolefinic aliphatic, diolefinic aliphatic (conjugated and nonconjugated), monoolefinic cycloaliphatic, diolefinic cycloaliphatic (conjugated and nonconjugated), and aromatic radicals and combinations of these such as aralkyl, alkaryl, and the like. Some or all of the R and R' radicals can be halogen-substituted, and can contain oxygen in the form of an acyclic ether linkage (—O—) or an oxirane group

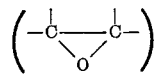

Further, the alkene oxides represented by the above formula can contain 1 or 2 olefinic linkages, 1 or 2 oxirane groups, and up to 1 ether linkage. In addition, both R' radicals can represent a divalent aliphatic hydrocarbon radical which, together with the carbon atoms of the oxirane group, can form a cycloaliphatic hydrocarbon nucleus containing from about 4 to about 10 carbon atoms and preferably from about 4 to about 8 carbon atoms.

Specific examples of some of the alkene oxides which are within the above structural formula and which can be homopolymerized or copolymerized using the catalyst system of this invention are ethylene oxide (epoxyethane);
1,2-epoxypropane (propylene oxide);
1,2-epoxybutane;
2,3-epoxy butane;
1,2-epoxypentane;
2,3-epoxypentane;
1,2-epoxyhexane;
3,4-epoxyhexane;
1,2-epoxyheptane;
2,3-epoxyoctane;
2,3-dimethyl-2,3-epoxypentane;
1,2-epoxy-4-methylpentane;

2,3-epoxy-5-methylhexane;
1,2-epoxy-4,4-dimethylpentane;
4,5-epoxyeicosane;
1-chloro-2,3-epoxypropane (epichlorohydrin);
1-bromo-2,3-epoxypropane;
1,5-dichloro-2,3-epoxypentane;
2-iodo-3,4-epoxybutane;
styrene oxide;
6-oxabicyclo[3·1·0]hexane;
7-oxabicyclo[4·1·0]heptane;
3-propyl-7-oxabicyclo[4·1·0]heptane;
bis(2,3-epoxybutyl) ether;
tert-butyl 4,5-epoxyhexyl ether; and
2-phenylethyl 3,4-epoxybutyl ether.

Unsaturated alkene oxides within the above structural formula, including ethers, which can be homopolymerized or copolymerized with the saturated alkene oxides include allyl 2,3-epoxypropyl ether (allyl glycidyl ether);
allyl 3,4-epoxybutyl ether;
1-methallyl 3,4-epoxyhexyl ether;
3-hexenyl 5,6-epoxyhexyl ether;
2,6-octadienyl 2,3,7,8-diepoxyoctyl ether;
6-phenyl-3-hexenyl 3-ethyl-5,6-epoxyhexyl ether;
3,4-epoxy-1-butene (butadiene monoxide);
3,4-epoxy-1-pentene;
5-phenyl-3,4-epoxy-1-pentene;
1,2,9,10-diepoxy-5-decene;
6,7-di-n-butyl-3,4,9,10-diepoxy-1,11-dodecadiene;
epoxy vinyl ether;
allyl 2-methyl-2,3-epoxypropyl ether;
3-cyclohexyl-2-propenyl 4-cyclohexyl-3,4-epoxybutyl ether;
2,4-pentadienyl 2,3-diethyl-3,4-epoxybutyl ether;
1-methallyl 6-phenyl-3,4-epoxyhexyl ether;
5-(4-tolyl)2,3-epoxypentyl vinyl ether;
bis[4-(3-cyclopentenyl)-2,3-epoxybutyl] ether;
2-(2,4-cyclohexadienyl)ethyl 2,3-epoxybutyl ether;
2-(2,5-cyclohexadienyl)ethyl 2-benzyl-4,5-epoxypentyl ethyl;
3,4-epoxy-1,5-hexadienyl isopropyl ether;
allyl 3,4-dimethyl-3,4-epoxyhexyl ether;
3,4-epoxy-4-(2,3-dimethylphenyl)1-butene;
3,4-dimethyl-3,4-epoxy-1-pentene;
5-(4-methylcyclohexyl)3,4-epoxy-1-pentene;
4,5-diethyl-4,5-epoxy-2,6-octadiene;
4-(2,4-cyclopentadienyl)1,2,6,7-diepoxyheptane; and
1-phenyl-1,2-epoxy-5,7-octadiene.

The novel catalyst system of this invention comprises a mixture of an organometallic compound and a metal salt of a beta-diketone. The organo-metallic compound of the catalyst can be represented by the formula $$R''_n M X_m$$

wherein R'' is a hydrocarbon radical selected from the group consisting of saturated aliphatic, saturated cycloaliphatic, and aromatic containing from 1 to 20 carbon atoms, inclusive; M is a metal selected from the group consisting of aluminum and zinc; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals the valence of the metal M. Organozinc and organoaluminum compounds within the above formula include diorganozinc compounds, triorganoaluminum compounds, organozinc monohalides, organozinc monohydrides, organoaluminum monohalides, organoaluminum dihalides, organoaluminum sesquihalides, organoaluminum monohydrides, and organoaluminum dihydrides. The organoaluminum sesquihalides as herein defined are intended to mean a mixture of organoaluminum monohalides and organoaluminum dihalides of the formulas $R''_2AlX$ and $R''AlX_2$, respectively, wherein R'' is the same as hereinbefore defined with respect to the general formula and X is a halogen. The organoaluminum sesquihalides can then be written as $R''_3Al_2X_3$ or as $R''_{1\ 1/2}AlX_{1\ 1/2}$. Exemplary organometallic compounds within the above general formula include trimethylaluminum;
triethylaluminum;
tri-n-propylaluminum;
triisobutylaluminum;
tri-n-hexylaluminum;
tri-n-octylaluminum;
tricyclohexylaluminum;
triphenylaluminum;
tri-n-butylaluminum;
tri-n-decylaluminum;
tri-n-eicosylaluminum;
methyldiphenylaluminum;
tribenzylaluminum;
bis(3,5-n-heptylphenyl)methylaluminum;
tri-1-naphthylaluminum;
di-n-octylphenylaluminum;
tri-4-tolylaluminum;
dimethylchloroaluminum;
methyldichloroaluminum;
methylisobutylchloroaluminum;
n-heptyldifluoroaluminum;
diphenylbromoaluminum;
dibenzylchloroaluminum;
di-n-octylchloroaluminum;
n-octylphenylchloroaluminum;
di-n-eicosyliodoaluminum;
n-butyldihydroaluminum;
methyldihydroaluminum;
diisopropylhydroaluminum;
ethylmethylhydroaluminum;
diphenylhydroaluminum;
benzyl-n-dodecylhydroaluminum;
bis(2,4,6-tri-n-butyloctyl)hydroaluminum;
dimethylzinc;
diethylzinc;
di-n-propylzinc;
diisopropylzinc;
di-n-butylzinc;
diisobutylzinc;
di-n-amylzinc;
di-n-hexylzinc;
di-n-octylzinc;
di-n-dodecylzinc;
dicyclopentylzinc;
dicyclohexylzinc;
bis(2,5-dimethylcyclopentyl)zinc;
bis(3,5-dimethylcyclohexyl)zinc;
diphenylzinc;
bis(2-n-hexyltetradecyl)zinc;
bis(4,-cyclohexyloctyl)zinc;
bis(2-n-butylcyclohexyl)zinc;
bis(2,4,8-trimethylhendecyl)zinc;
bis(7-n-pentyltetradecyl)zinc;
bis[2-(2,3,5-tri-n-butylphenyl)ethyl]zinc;
dibenzylzinc;
bis(4,6-dicyclopentyldecyl)zinc;
methylethylzinc;
ethylisopropylzinc;
n-propyl-n-hexylzinc;
methylchlorozinc;
ethylbromozinc;
n-propylchlorozinc;
n-amylbromozinc;
n-hexyliodozinc;
n-octylchlorozinc;
cyclopentylchlorozinc;
cyclohexylbromozinc;
2-n-hexyltetradecylchlorozinc;

7-n-pentyltetradecylbromozinc;
benzylbromozinc;
4,6-dicyclopentyldecylbromozinc;
n-dodecylfluorozinc;
3,5-methylcyclohexylchlorozinc;
cyclohexyliodozinc;
cyclohexylhydrozinc; and
n-amylhydrozinc.

The metal salt of the beta-diketone portion of the catalyst system can be represented by the formula

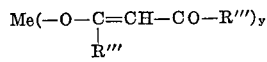

wherein Me is a metal selected from Groups II-A, III-A, IV-A, I-B, and II-B of the Periodic Table of the Elements in the "Handbook of Chemistry and Physics," 45th edition, page B-2, The Chemical Rubber Company (1964); each R''' is a radical selected from the group consisting of saturated aliphatic, saturated cycloaliphatic, and aromatic containing from 1 to 10 carbon atoms, inclusive; and y is an integer equal to the valence of the metal Me (Moeller, "Inorganic Chemistry," page 241, Wiley and Sons, 1952). Preferred metals within the above groups include calcium, strontium, barium, copper, beryllium, magnesium, zinc, cadmium, mercury, boron, aluminum, gallium, indium, thallium, silicon, germanium, tin, and lead.

Specific beta-diketones which can be combined with a metal from the above groups to form the corresponding metal salt include 2,4-pentanedione (acetylacetone); 3,5-heptanedione; 11,13-tricosanedione; 1,3-dicyclohexyl-1,3-propanedione; 1,5-dicyclopentyl-2,4-pentanedione; 1,3-diphenyl - 1,3 - propanedione; 1,5-diphenyl-2,4-pentanedione; 2,8 - dimethyl - 4,6 - nonanedione; 1,3 - di(4-n-butylphenyl)-1,3-propanedione; 1,11-diphenyl-5,7-undecanedione; 1-phenyl-1,3-butanedione; 2,4-decanedione; and 1-(3,5-dimethylcyclohexyl)2,4-pentanedione.

The mole ratio of the organometallic compound to the metal salt of the beta-diketone in the catalyst system is within the range of from about 2:1 to 100:1 and preferably in the range of from about 5:1 to about 30:1.

Although the amount of catalyst used for effecting polymerization of the alkene oxides is largely a matter of choice, the catalyst level is preferably and for convenience determined on the basis of the organometallic compound in the catalyst system. As a general rule, the amount of catalyst is maintained within the range of from about 1 to about 100 gram millimoles of organometal per 100 grams of monomer being polymerized and preferably in the range of from about 5 to about 40 gram millimoles of organometal per 100 grams of monomer. In the copolymerization of two or more alkene oxide monomers, the amount of catalyst is based on the total amount of all monomers.

The alkene oxide polymerization reaction can be carried out either as a batch process or as a continuous process with the novel catalyst system being added in a single initial charge or in predetermined increments during polymerization. Similarly, the monomers may be introduced into the reaction zone in one charge or they may be added gradually during polymerization. In order to expedite and improve the efficiency of the polymerization reaction, it is generally preferred that the reaction be carried out in the presence of an inert diluent. Suitable diluents which can be used for this purpose include paraffinic, cycloparaffinic, and aromatic hydrocarbons containing from about 4 to about 10 carbon atoms per molecule. Exemplary diluents which can be used are butane, pentane, hexane, decane, cyclopentane, cyclohexane, methylcyclohexane, benzene, toluene, xylene, ethylbenzene, and the like. It is also within the spirit and scope of this invention to employ halogenated hydrocarbons such as chlorobenzene and the like as diluents. Since the actual diluent employed is largely a matter of choice, it is obviously possible to employ other diluents than those herein identified without departing from the spirit and scope of the invention. Mixtures of suitable compounds can also be employed as diluents.

The temperature and pressure at which the polymerization process is effected can vary over a rather wide range. Generally, the polymerization is conducted at a temperature within the range of from about 40 to about 250° F. and preferably within the range of from about 85 to 200° F. Polymerization is usually conducted at a pressure which will maintain the materials in the liquid state. It is obvious that the reaction can be conducted at superatmospheric pressures of several thousand pounds if desired.

The duration of the polymerization reaction will depend primarily upon the temperature and pressure. The process can be conducted for a period of from less than a minute to about 100 hours or more. A preferred range is from 10 minutes to about 50 hours.

The alkene oxide polymers produced in accordance with the novel catalyst system of this invention exhibit extremely good low temperature flexibility. The polymers are particularly resistant to the effects of heat and to the effects of ozone. The polymers of alkene oxide have unlimited utility in the automobile industry for fabricating articles such as motor mounts, body mounts, suspension system parts, hoses, and tubing.

The following examples will serve to illustrate the improved results obtained by polymerizing alkene oxides with the novel catalyst system of this invention. It is to be understood that such examples are for the purpose of illustration only, and that many variations and modifications can be made from the various examples by one skilled in the art without departing from the concept of this invention.

EXAMPLES 1–15

A series of runs was conducted whereby 1,2-epoxypropane was polymerized by means of the novel catalyst system of this invention. In the several runs made, the catalyst system was varied to include organometallic compounds such as triisobutylaluminum and diethylaluminum chloride in admixture with metal salts of beta-diketones such as cupric acetylacetonate, zinc acetylacetonate, and aluminum acetylacetonate. The materials were changed to a reactor in the following proportions:

| | |
|---|---|
| 1,2-epoxpropane, parts by weight | 100 |
| Toluene, parts by weight | 860 |
| Triisobutylaluminum (TBA) or diethylaluminum chloride (DEAC) | [1] 30 |
| Metal salt of beta-diketone | [1] variable |
| Temperature, ° F. | 158 |
| Time, hours | 48 |

[1] Gram millimoles per 100 grams monomer metal salt of diketone. Cupric acetylacetonate, zinc acetylacetonate, aluminum acetylacetonate.

The actual polymerization technique employed involved the steps of charging the reactor with toluene and thereafter purging it with nitrogen. The 1,2-epoxypropane was then charged to the reactor followed by the organaluminum compound and the metal salt of the beta-diketone. At the termination of each run, the viscosity of the reaction mixture was reduced by diluting it with actone, isopropyl alcohol, or a mixture of these materials. Approximately one weight percent, based on the polymer, of 2,2'-methylene - bis(4-methyl-6-tertbutylphenol) antioxidant was added. The mixture was poured into water with high speed stirring and subsequently separated into an aqueous phase and an organic phase. The organic phase was removed and the polymer was recovered from it by evaporating the diluent. The polymer product was then dried under vacuum. The polymers thus produced were rubbers and were observed to be gel-free. Table I below illustrates the properties of each of the polymers obtained with the different catalyst systems employed.

TABLE I

| Example Number | Organo-aluminum compound | Metal salt of the beta-diketone Type | Mhm. | Monomer conversion percent | Inherent viscosity |
|---|---|---|---|---|---|
| 1 | TBA | Cupric acetylacetonate | 2 | 88 | 3.21 |
| 2 | TBA | ----do---- | 4 | 88 | 4.46 |
| 3 | TBA | ----do---- | 6 | 86 | 4.48 |
| 4 | TBA | Zinc acetylacetonate | 2 | 74 | 3.94 |
| 5 | TBA | ----do---- | 4 | 83 | 3.75 |
| 6 | TBA | ----do---- | 6 | 82 | 6.68 |
| 7 | TBA | Aluminum acetylacetonate | 2 | 73 | 2.08 |
| 8 | TBA | ----do---- | 4 | 78 | 2.88 |
| 9 | TBA | ----do---- | 6 | 82 | 3.66 |
| 10 | DEAC | Cupric acetylacetonate | 2 | 73 | 3.63 |
| 11 | DEAC | ----do---- | 4 | 73 | 4.54 |
| 12 | DEAC | Zinc acetylacetonate | 2 | 63 | 7.40 |
| 13 | DEAC | ----do---- | 4 | 62 | 8.28 |
| 14 | DEAC | Aluminum acetylacetonate | 2 | 78 | 3.33 |
| 15 | DEAC | ----do---- | 4 | 83 | 4.75 |

In order to determine the inherent viscosity, one-tenth gram of polymer was placed in a wire cage made from 80-mesh screen and the cage was placed in 100 ml. of toluene contained in a wide-mouth, 4-ounce bottle. After standing at room temperature (approximately 77° F.) for about 24 hours, the cage was removed and the solution filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

The monomer conversion in each of the examples is in excess of 60 percent and ranges up to 88 percent. The polymers produced by all of the examples were rubbery in nature.

Several polymerization runs were conducted wherein 1,2-epoxypropane was polymerized with the catalyst systems of the prior art in order to show the improved result obtained by the catalyst systems of this invention. Polymerization was conducted using the same procedures and proportions for the materials as was used in Examples 1-15 except that the metal salt of the beta-diketone portion of the catalyst system was prepared using the metal acetylacetonates of the prior art. The results of the several runs conducted are reported in Table II below.

obtained with the catalyst system of this invention is about 78 percent. Although the molecular weight of the polymers obtained in Runs 3, 4, 6, and 7 is reasonably high, the monomer conversion for these runs was much lower than the conversions obtained by the catalyst systems in Examples 1-15. Not only were the conversions much lower in Runs 8-13, but the polymers produced were liquid.

Examples 11, 13, and 15 were conducted in the same manner as Runs 5, 6, and 7 and are identical thereto except as to the metal salt of the beta-diketone employed. The average monomer conversion in Examples 11, 13, and 15 is about 73 percent and the average monomer conversion in Runs 5, 6, and 7 is only about 43 percent thus illustrating the improvement obtained from the catalyst system of this invention.

EXAMPLES 16-20

A series of runs was conducted for the polymerization of 1,2-epoxypropane by means of a catalyst system comprising triisobutylaluminum and acetylacetonates of calcium and beryllium. Except for the amounts of calcium acetylacetonate and beryllium acetylacetonate employed, the technique of polymerization and the relative proportions of the components was the same as that used in connection with Examples 1-15. The actual amounts of the metal acetylacetonates used are reported as gram millimoles per 100 grams monomer (mhm.) in Table III. The results obtained from these examples are reflected in Table III.

TABLE II

| Run Number | Organo-aluminum compound | Metal beta-diketone Type | Mhm. | Monomer conversion (percent) | Inherent viscosity |
|---|---|---|---|---|---|
| 1 | TBA | Nickel acetylacetonate | 3 | 49 | 2.12 |
| 2 | TBA | ----do---- | 6 | 24 | 3.01 |
| 3 | DEAC | ----do---- | 3 | 40 | 3.81 |
| 4 | DEAC | ----do---- | 6 | 24 | 4.50 |
| 5 | DEAC | Cobalt acetylacetonate | 4 | 30 | (¹) |
| 6 | DEAC | Iron acetylacetonate | 4 | 52 | 3.67 |
| 7 | DEAC | Vanadium acetylacetonate | 4 | 48 | 4.3 |
| 8 | TBA | Chromium acetylacetonate | 6 | 47 | 0.87 |
| 9 | TBA | ----do---- | 3 | 43 | 0.81 |
| 10 | DEAC | ----do---- | 6 | 52 | 0.84 |
| 11 | DEAC | ----do---- | 3 | 53 | 0.74 |
| 12 | TBA | ----do---- | 3 | ² 38 | 0.92 |
| 13 | TBA | | | ³ 58 | 0.93 |

¹ The inherent viscosity was not determined; however, the product was a sticky solid.
² Polymerization time was 24 hours.
³ Polymerization time was 66 hours.

Polymerization was conducted at a temperature of 122° F. in Runs 8 through 11. In all of the other runs reported in Table II, polymerization was conducted at a temperature of 158° F. for a period of 48 hours except for the two periods noted in Runs 12 and 13.

It is obvious that the catalyst system of this invention is much more effective for polymerizing alkene oxide than the catalyst systems of the prior are. For example, the average monomer conversion obtained with prior art catalysts is about 43 percent whereas the monomer conversion

TABLE III

| Example Number | Metal acetylacetonate Type | Mhm. | Monomer conversion (percent) | Inherent viscosity |
|---|---|---|---|---|
| 16 | Calcium acetylacetonate | 2 | 77 | 3.05 |
| 17 | ----do---- | 4 | 76 | 8.92 |
| 18 | Beryllium acetylacetonate | 2 | 72 | 2.42 |
| 19 | ----do---- | 4 | 62 | 3.26 |
| 20 | ----do---- | 6 | 60 | 4.24 |

The polymers produced by Examples 16–20 were rubbery. The average monomer conversion of 69 percent in Examples 16–20 shows the improved result obtained by using the catalyst system of this invention. The inherent viscosity was determined by the same technique as that described in connection with Examples 1–15.

EXAMPLE 21

Allyl glycidyl ether was copolymerized with 1,2-epoxypropane by means of a catalyst system comprising triisobutylaluminum and zinc acetylacetonate. The components were employed in the following proportions:

| | |
|---|---|
| 1,2-epoxypropane, parts by weight | 92 |
| Allyl glycidyl ether, parts by weight | 8 |
| Toluene, parts by weight | 860 |
| Triisobutylaluminum | [1] 30 |
| Zinc acetylacetonate | [1] 4 |
| Temperature, ° F. | 158 |
| Time, hours | 48 |

[1] Gram millimoles per 100 grams monomer.

The technique employed for effecting the copolymerization reaction was the same as the polymerization technique described in Examples 1–15. The monomer conversion was measured and found to be about 43 percent. The inherent viscosity of the polymer was measured by the technique previously described and found to be about 4.5. The total unsaturation of the polymer was measured and found to be 0.58 mmoles Icl./g.

The procedure used to determine total unsaturation by iodine chloride titration was as follows: a 0.5 gram sample of polymer was dissolved in a 75/25 volume mixture of carbon disulfide and chloroform, a chloroform solution of iodine chloride of known concentration (approximately 0.09–0.10 molar) was added, the mixture was placed in a 25° C. bath for one hour to allow time for reaction, and the excess of iodine chloride was titrated with 0.05 N sodium thiosulfate. The millimoles of iodine chloride which reacted with 1 gram of sample was then calculated. A blank was run using only solvent and iodine chloride and appropriate correction was made when calculating unsaturation.

This example illustrates the feasibility of using the novel catalyst system of this invention to provide a rubbery copolymer having unsaturation sufficient to allow it to be sulfur vulcanized.

1,2-epoxypropane and allyl glycidyl ether were copolymerized using iron acetylacetonate and manganese acetylacetonate in admixture with triisobutylaluminum as catalyst systems in an effort to compare these catalysts with the catalyst system of this invention. Although the inherent viscosities of the copolymers produced by the catalyst having manganese and iron were comparable with the inherent viscosities of the copolymers produced by the catalyst system of this invention, the monomer conversion and the total unsaturation was much lower than that obtained with the catalyst of this invention.

Although the invention has been described in considerable detail, it must be understood that such detail is for the purpose of illustration only and that many variations and modifications can be made by one skilled in the art without departing from the spirit and scope of the invention.

I claim:
1. A catalyst system consisting essentially of:
 (a) an organozinc compound of the formula

$$R''_n Zn X_m$$

wherein $R''$ is a hydrocarbon radical selected from the group consisting of saturated aliphatic, saturated cycloaliphatic, and aromatic containing from 1 to 20 carbon atoms, inclusive; X is selected from the class consisting of hydrogen, fluorine, chlorine, bromine, and iodine; $n$ is 1 or 2; $m$ is 0 or 1; and the sum of $n$ and $m$ equals the valence of the zinc; and
 (b) a metal salt of a beta-diketone of the formula $$Me(-O-C=CH-CO-R''')_y$$
$$\phantom{Me(-O-C=CH-CO-}|$$
$$\phantom{Me(-O-C=CH-CO-}R'''$$

where Me is a metal selected from Groups III–A, IV–A, I–B, and II–B of the Periodic Table; each $R'''$ is a radical selected from the group consisting of saturated aliphatic, saturated cycloaliphatic, and aromatic containing from 1 to 10 carbon atoms, inclusive; and $y$ is an integer equal to the valence of the metal Me; and
wherein the mole ratio of the organozinc compound to the metal salt of the beta-diketone is within the range of about 2:1 to 100:1.

2. A catalyst system according to claim 1 wherein the organozinc compound is selected from the group consisting of diorganozincs, organozinc monohalides, and organozinc monohydrides.

3. A catalyst system according to claim 1 wherein the metal salt of a beta-diketone is selected from the group consisting of cupric acetylacetonate, zinc acetylacetonate, aluminum acetylacetonate, calcium acetylacetonate, and beryllium acetylacetonate.

4. A catalyst system according to claim 1 wherein the organometallic compound is diethylzinc.

5. A catalyst system according to claim 4 wherein the metal salt of a beta-diketone is selected from the group consisting of cupric acetaylacetonate, zinc acetylacetonate, and aluminum acetylacetonate.

References Cited

UNITED STATES PATENTS

| | | | |
|---|---|---|---|
| 2,866,761 | 12/1958 | Hill et al. | 252—431X |
| 2,870,100 | 1/1959 | Stewart et al. | 260—2(EPA) |
| 3,114,743 | 12/1963 | Horne | 252—431X |
| 3,234,383 | 2/1966 | Barney | 252—431X |
| 3,409,681 | 11/1968 | Kroll | 252—431X |
| 3,323,902 | 6/1967 | Kroll | 75—121X |

PATRICK P. GARVIN, Primary Examiner

U.S. Cl. X.R.

260—2